(12) United States Patent
Sarkar et al.

(10) Patent No.: US 8,509,147 B1
(45) Date of Patent: Aug. 13, 2013

(54) WIRELESS COMMUNICATION DEVICE REGISTRATION WITH MULTIPLE BASE STATIONS

(75) Inventors: Debasish Sarkar, Irvine, CA (US); Siddharth S. Oroskar, Overland Park, KS (US); Sachin R. Vargantwar, Overland Park, KS (US); Manoj Shetty, Overland Park, KS (US); Deveshkumar Narendrapratap Rai, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 991 days.

(21) Appl. No.: 12/395,118

(22) Filed: Feb. 27, 2009

(51) Int. Cl.
*H04W 4/00* (2009.01)

(52) U.S. Cl.
USPC ........... 370/328; 370/329; 370/341; 370/348; 455/422.1; 455/435.1; 455/445; 455/450

(58) Field of Classification Search
None
See application file for complete search history.

(56) References Cited

U.S. PATENT DOCUMENTS

| | | | |
|---|---|---|---|
| 6,064,691 A | 5/2000 | Banister et al. | |
| 6,611,512 B1* | 8/2003 | Burns | 370/342 |
| 7,280,581 B2 | 10/2007 | Khan | |
| 7,522,921 B2* | 4/2009 | Thompson | 455/433 |
| 2002/0132621 A1* | 9/2002 | Takano et al. | 455/435 |
| 2006/0171296 A1 | 8/2006 | Agiwal et al. | |
| 2007/0197220 A1* | 8/2007 | Willey | 455/435.1 |
| 2010/0197320 A1* | 8/2010 | Ulrich et al. | 455/456.1 |

* cited by examiner

*Primary Examiner* — Ian N Moore
*Assistant Examiner* — Brian T Le (57) ABSTRACT

In a communication system, a first base station wirelessly transmits a first base station access code. A second base station wirelessly transmits a second base station access code. A wireless communication device wirelessly receives the first base station access code and the second base station access code and processes the first base station access code and the second base station access code to generate a common access code. The wireless communication device wirelessly transmits the common access code. The first base station wirelessly receives the common access code and processes the common access code to initiate the registration of the wireless communication device with the first base station. The second base station wirelessly receives the common access code and processes the common access code to initiate the registration of the wireless communication device with the second base station.

20 Claims, 7 Drawing Sheets

| ACCESS CODE TABLE FOR BASE STATION 602 | |
|---|---|
| SECOND BASE STATION | COMMON ACCESS CODE |
| 603 | E8DF643AB |
| 604 | 56FC9D08A |
| 605 | C385A8CE2 |

WIRELESS COMMUNICATION DEVICE REGISTRATION WITH MULTIPLE BASE STATIONS

TECHNICAL BACKGROUND

A mobile communication device registers with a wireless base station to subsequently exchange wireless communications with that base station. The mobile communication device is often in range of multiple base stations and typically registers with the one base station that provides the strongest wireless signal strength. As the mobile communication device moves about, a second base station may begin to offer a stronger wireless signal. In response, the mobile communication device and the two base stations perform a hand-off procedure from the first base station to the second base station that is now providing the stronger wireless signal. In some cases, the mobile communication device registers with the first base station as it is moving rapidly toward the second base station. This typically requires that the handoff to the second base station be performed immediately after the registration with the first base station.

OVERVIEW

In a communication system, a first base station wirelessly transmits a first base station access code, and a second base station wirelessly transmits a second base station access code. A wireless communication device wirelessly receives the first base station access code and the second base station access code. The wireless communication device processes the first base station access code and the second base station access code to generate a common access code. The wireless communication device wirelessly transmits the common access code. The first base station wirelessly receives the common access code and processes the common access code to initiate the registration of the wireless communication device with the first base station. The second base station wirelessly receives the common access code and processes the common access code to initiate the registration of the wireless communication device with the second base station.

DETAILED DESCRIPTION

Figure 1:
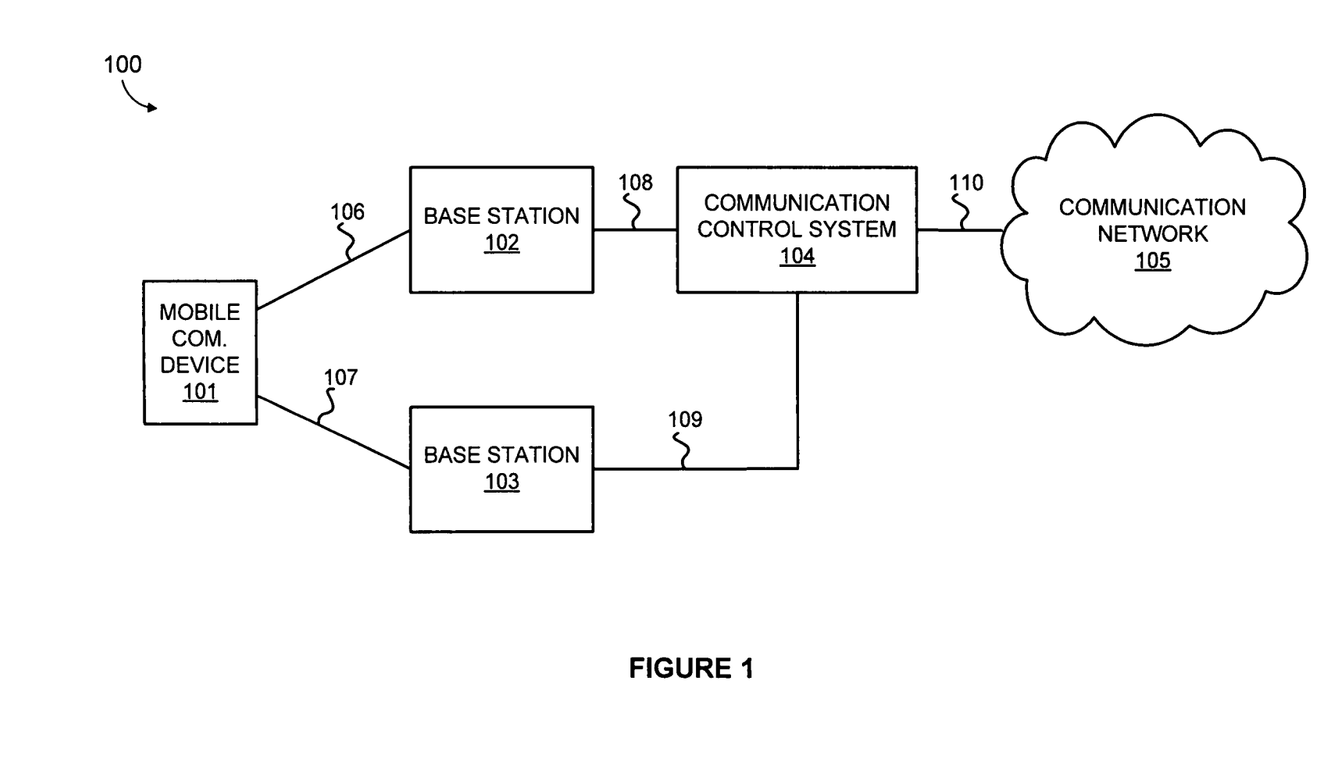
FIG. 1 is a block diagram illustrating a communication system.

FIG. 1 is a block diagram illustrating communication system 100. Communication system 100 comprises mobile communication device 101, base stations 102-103, communication control system 104, and communication network 105. Mobile communication device 101 and base station 102 communicate over wireless link 106. Mobile communication device 101 and base station 103 communicate over wireless link 107. Base station 102 and communication control system 104 communicate over link 108. Base station 103 and communication control system 104 communicate over link 109. Communication control system 104 and communication network 105 communicate over link 110.

Mobile communication device 101 comprises Radio Frequency (RF) communication circuitry and antenna apparatus. Mobile communication device 101 typically includes other components, such as processing circuitry, user interfaces, software, battery power supply, and storage devices. Mobile communication device 101 could be a mobile telephone, computer, personal digital assistant, e-book, music player, video player, wireless network interface card, or some other wireless communication apparatus—including combinations thereof.

Base stations 102-103 comprises RF communication circuitry and antenna apparatus. Base stations 102-103 typically include other components such as filters, amplifiers, storage devices, software, processing circuitry, cabling, power supplies, network communication interfaces, and structural supports. Base stations 102-103 could be Internet access nodes, telephony service nodes, wireless data access points, or some other wireless communication apparatus—including combinations thereof.

Communication control system 104 comprises computer and communication circuitry and software. Communication control system 104 typically includes other components such a routers, servers, data storage systems, and power supplies. Communication control system 104 could be a mobile switching center, network gateway system, Internet access node, or some other communication system—including combinations thereof.

Communication network 105 comprises a core communication network, telephony network, optical network, internet network, media delivery network, or some other network that provides communication services or media content—including combinations thereof.

Links 106 and 107 use the air or space as the communication media. Links 106 and 107 may use various protocols, such as world wide interoperability for microwave access, wireless fidelity, code division multiple access, time division multiple access, global system for mobile communications, long term evolution, evolution—data only, or some other wireless communication format—including combinations thereof. Links 108-110 may use various communication media, such as air, metal, optical fiber, or some other signal propagation path—including combinations or variations thereof. Links 108-110 may use various protocols, such as Internet, telephony, time division multiplex, optical networking, world wide interoperability for microwave access, long term evolution, or some other communication format—including combinations or variations thereof. Links 108-110 may be direct links or they may include various intermediate components, systems, and networks.

In operation, mobile communication device 101 communicates with both base station 102 and base station 103 using a common access code to request dual registration with both base stations 102-103. If the wireless signal strength with both base stations is not sufficient to support dual registration, then mobile communication device 101 would only communicate and register with the base station having sufficient signal strength using that base station's specific access code—and not the common access code. In some examples, mobile communication device 101 maintains the dual registrations. In other examples, mobile communication device 101 selects one of the base stations for use after the dual registration and de-registers with the other base station.

Figure 2:
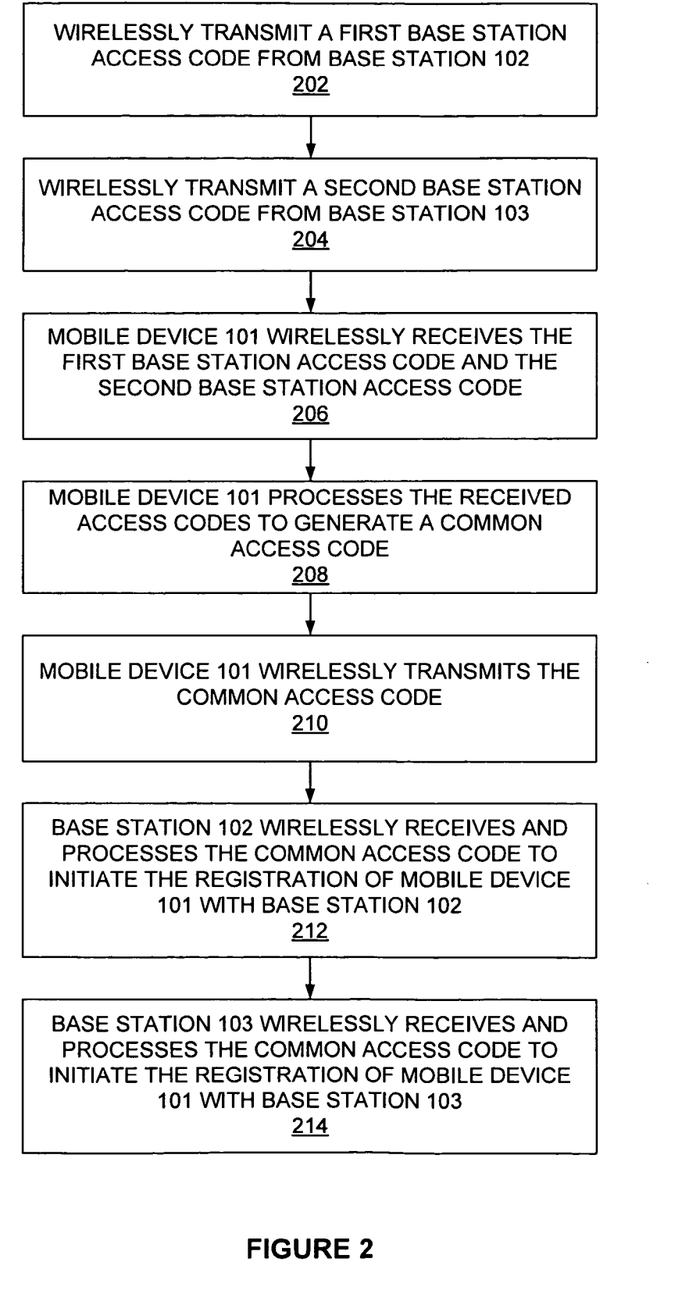
FIG. 2 is a flow diagram illustrating a process for registering a mobile device with multiple base stations.

FIG. 2 is a flow diagram illustrating a process for registering mobile communication device 101 with base stations 102-103 in communication system 100. Base station 102 wirelessly transmits a first base station access code (202). The first base station access code is the signal that mobile communication device 101 would use to register only with base station 102. Base station 103 wirelessly transmits a second base station access code (204). The second base station access code is the signal that mobile communication device 101 would use to register only with base station 103. These access codes could be code division multiple access masking codes that are broadcast in base station pilot signals, although other types of suitable access coding could be used.

Mobile communication device 101 wirelessly receives the first base station access code and the second base station access code (206). Mobile communication device 101 processes the received access codes to generate a common access code (208). The common access code may be generated in various ways. For example, mobile communication device 101 may access a data structure, such as a table, to find the common access code based on the first base station access code and the second base station access code. In another example, mobile communication device 101 may generate the common access code by combining portions of the first base station access code and the second base station access code. In another example, mobile communication device 101 may generate the common access code by processing the first base station access code and the second base station access code with a mathematical function, such as addition. Other methods of generating the common access code based on the first and second access codes may also be used. The common access code could be code division multiple access mask, although other types of suitable access coding could be used.

After generating the common access code, mobile communication device 101 wirelessly transmits the common access code (210). Transmitting the common access code may entail using the common access code to mask an identification number for mobile communication device 101 and then transmitting the masked identification number, although other transmission techniques could be used for the common access code. Base station 102 wirelessly receives and processes the common access code to initiate the registration of mobile communication device 101 with base station 102 (212). Base station 103 wirelessly receives and processes the common access code to initiate the registration of mobile communication device 101 with base station 103 (214). Note that the use of the common access code by wireless communication device 101 signals to communication system 100 that dual registration is being requested through multiple base stations.

The registration process includes authenticating mobile communication device 101 and authorizing communication services for mobile communication device 101. Dual registration also includes assigning wireless communication channels to mobile communication device 101 for use with each of base stations 102-103. The wireless communication channels allow mobile communication device 101 to exchange control messages (often referred to as pages) with base stations 102-103. For example, mobile communication device 101 may receive an incoming call alert or transfer an Internet connection request in control messages over the communication channels. In some examples, base stations 102-103 perform the registration. In other examples, base stations 102-103 communicate with communication control system 104 to initiate a dual registration process for wireless communication device 101, and communication control system 104 performs the registration process.

Figure 3:
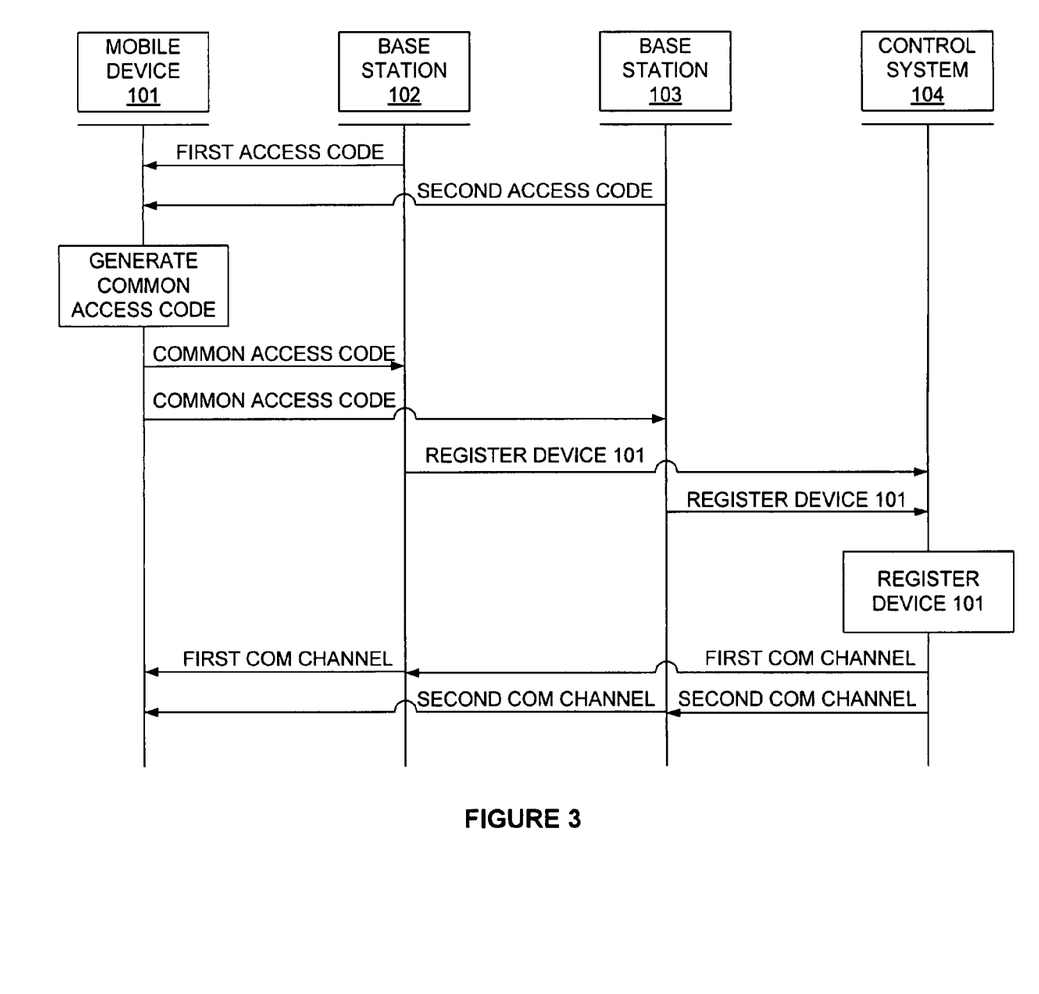
FIG. 3 is a sequence diagram illustrating a process for registering a mobile device with multiple base stations.

FIG. 3 is a sequence diagram illustrating a process for registering mobile communication device 101 with base stations 102-103. Base station 102 wirelessly transmits a first base station access code. Concurrently, base station 103 wirelessly transmits a second base station access code. Mobile communication device 101 wirelessly receives the first base station access code and the second base station access code. Mobile communication device 101 processes the first base station access code and the second base station access code to generate a common access code. Mobile communication device 101 wirelessly transmits the common access code, and base stations 102-103 receive the common access code.

Base station 102 processes the common access code to transfer a registration request for mobile communication device 101 to communication control system 104. Likewise, base station 103 processes the common access code to transfer a registration request for mobile communication device 101 to communication control system 104. Communication control system 104 registers mobile communication device 101—including assigning wireless communication channels to mobile communication device 101 for both base stations 102-103. Communication control system 104 indicates at least a first communication channel to base station 102, which in turn, indicates the first communication channel to mobile communication device 101. Communication control system 104 also indicates at least a second communication channel to base station 103, which in turn, indicates the second communication channel to mobile communication device 101.

Although not shown, mobile communication device 101 may now use either the first communication channel or the second communication channel to request or receive communication services. Mobile communication device 101 may use the first communication channel to base station 102 and de-register with base station 103. Mobile communication device 101 may use the second communication channel to base station 103 and de-register with base station 102. Mobile communication device 101 may use both of the first and second communication channels and both base stations 102-103.

Figure 4:
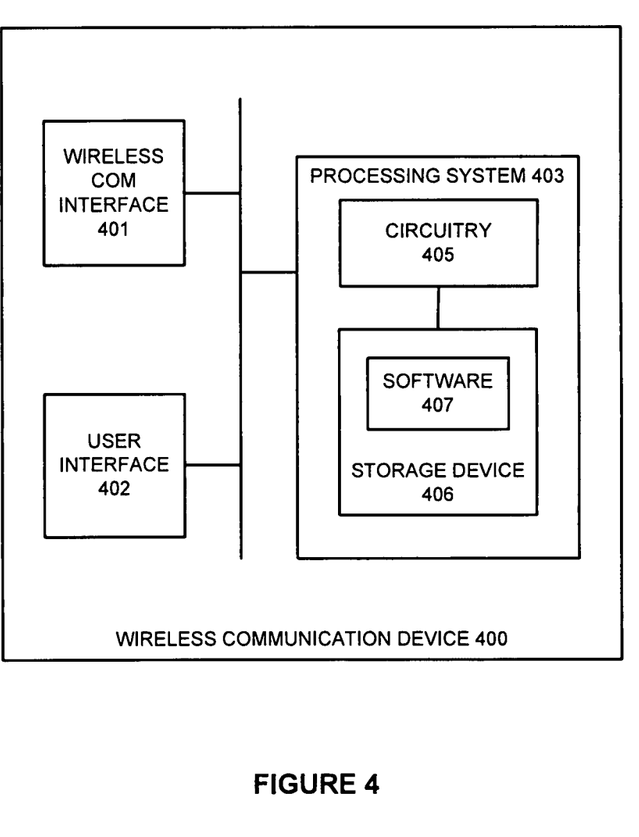
FIG. 4 is a block diagram that illustrates a wireless communication device.

FIG. 4 is a block diagram that illustrates wireless communication device 400. Wireless communication device 400 is an example of mobile communication device 101, although mobile communication device 101 may use alternative configurations. Wireless communication device 400 comprises wireless communication interface 401, user interface 402, and processing system 403. Processing system 403 is linked to wireless communication interface 401 and user interface 402. Processing system 403 includes circuitry 405 and storage device 406 that stores operating software 407. Wireless communication interface 401 comprises components that communicate over a wireless link under the control of processing system 403. Wireless communication interface 401 comprises an RF transceiver and antenna or some other wireless communication device. User interface 402 comprises components that interact with the user under the control of processing system 403. User interface 402 may include a speaker, microphone, buttons, lights, display screen, touch screen, touch pad, scroll wheel, or some other user input/output apparatus.

Circuitry 405 comprises microprocessor and other circuitry that retrieves and executes operating software 407 from storage device 406 to control wireless communication interface 401 and user interface 402. Storage device 406 comprises a disk drive, flash drive, memory circuitry, or some other memory device. Operating software 407 comprises computer programs, firmware, or some other form of machine-readable processing instructions. Operating software 407 may include an operating system, utilities, drivers, network interfaces, applications, or some other type of software. When executed by circuitry 405, operating software 407 directs processing system 403 to operate wireless communication device 400 as described herein. In particular, operating software 407 directs processing system 403 register with multiple base stations as described herein.

Figure 5:
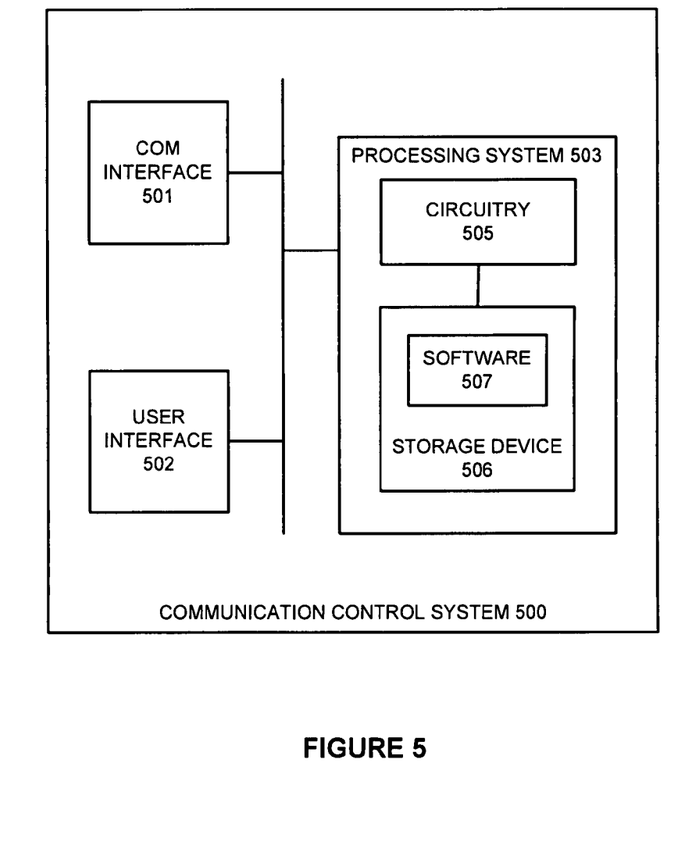
FIG. 5 is a block diagram that illustrates a communication control system.

FIG. 5 is a block diagram that illustrates communication control system 500. Communication control system 500 is an example of communication control system 104, although communication control system 104 may use alternative configurations. Communication control system 500 comprises communication interface 501, user interface 502, and processing system 503. Processing system 503 is linked to communication interface 501 and user interface 502. Processing system 503 includes circuitry 505 and storage device 506 that stores operating software 507. Communication interface 501 comprises components that communicate over communication links under the control of processing system 503. Communication interface 501 comprises network cards, ports, RF transceivers, processing circuitry and software, or some other communication devices. Communication interface 501 may be configured to communicate over metallic, wireless, or optical links. Communication interface 501 may be configured to use time division multiplex, microwave, internet protocol, optical networking, or some other communication protocols. User interface 502 comprises components that interact with a user under the control of processing system 503. User interface 502 may include a keyboard, display screen, mouse, touch pad, or some other user input/output apparatus.

Circuitry 505 comprises microprocessor and other circuitry that retrieves and executes operating software 507 from storage device 506 to control wireless communication interface 501 and user interface 502. Storage device 506 comprises a disk drive, flash drive, memory circuitry, or some other memory device. Operating software 507 comprises computer programs, firmware, or some other form of machine-readable processing instructions. Operating software 507 may include an operating system, utilities, drivers, network interfaces, applications, or some other type of software. When executed by circuitry 505, operating software 507 directs processing system 503 to operate wireless communication device 500 as described herein. In particular, operating software 507 directs processing system 503 to register mobile communication device 101 with multiple base stations as described herein.

Figure 6:
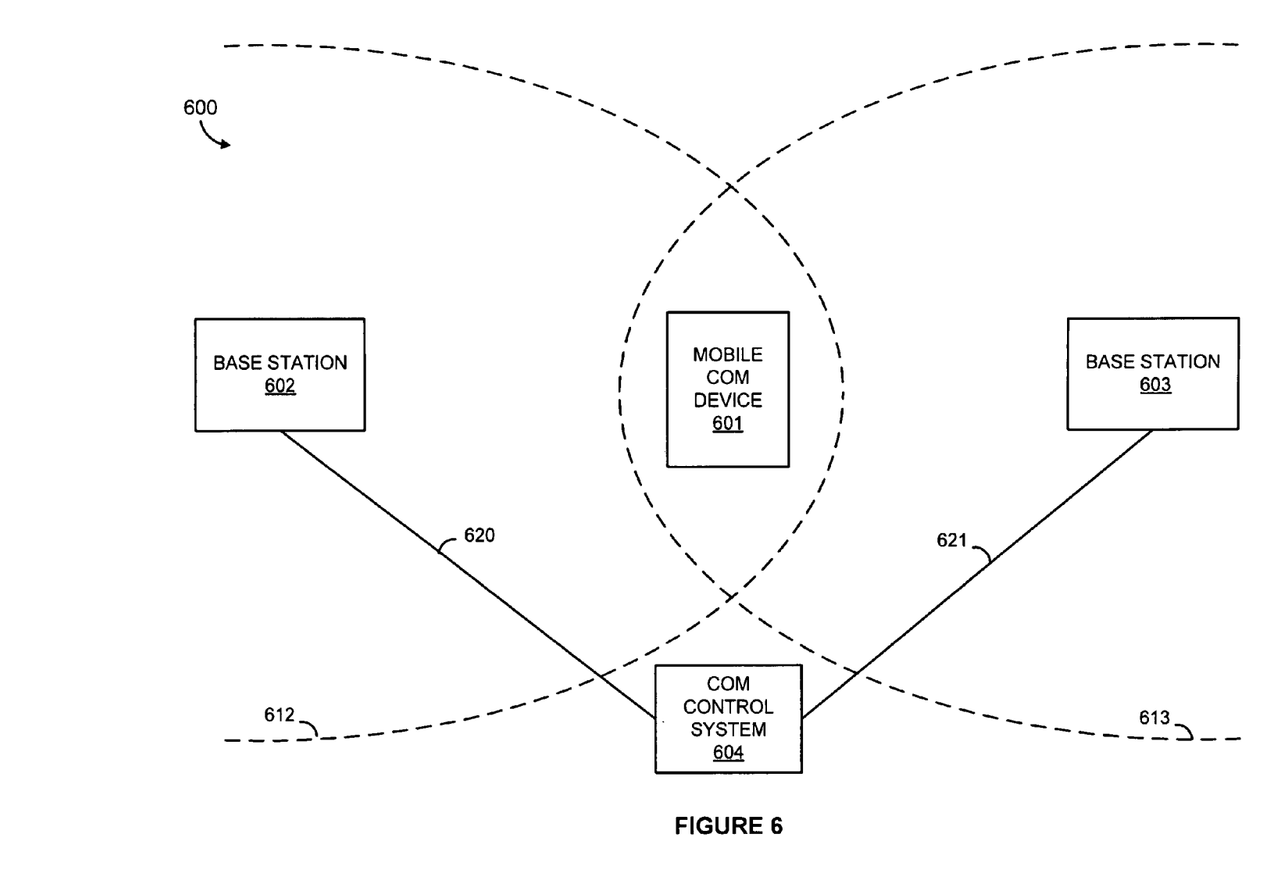
FIG. 6 is a block diagram illustrating a communication system.

FIG. 6 is block diagram illustrating communication system 600. Communication system 600 could be configured and operate as discussed above for communication system 100 with some optional additional features. Communication system 600 includes mobile communication device 601, base station 602, base station 603, and communication control system 604. Arc 612 represents the wireless signal coverage area of base station 602. Arc 613 represents the wireless signal coverage area of base station 603. Communication control system 604 communicates with base station 602 over backhaul link 620. Communication control system 604 communicates with base station 603 over backhaul link 621.

Base station 602 wirelessly broadcasts a first access code to any wireless communication devices within coverage area 612. Base station 603 wirelessly broadcasts a second access code to any wireless communication devices within coverage area 613. In this example, mobile communication device 601 is in range of both base stations 602-603 and receives both access codes. (If mobile communication device 601 were in range of only one of the base stations and not the other, then device 601 would only register with that one base station using that base station's specific access code.) Thus, mobile communication device 601 could use a single one of the access codes to register with a single one of base stations 602-603, or mobile communication device 601 could generate a common access code to dual register with both base stations 602-603. Thus, mobile communication device 601 determines if it will register with one base station or dual register with two base stations.

The determination could be based on comparative signal strength. For example, mobile communication device 601 might dual register using a common access code if the difference in received signal strength between the first access code and the second access code is below a threshold. If the difference in received signal strength between the first and second access codes is above the threshold, then mobile communication device 601 would only register with the base station having the stronger access code signal.

In another example, mobile communication device 601 might dual register using a common access code if the received signal strength for the first access code and the second access code are both above a threshold. If the received signal strength for either of the first and second access codes is below the threshold, then mobile communication device 601 would only register with the base station having the stronger access code signal.

The determination to dual register could also be based on the movement of device 601. Many wireless communication devices use an internal location system to determine their velocity and direction—including device 601. Mobile communication device 601 might dual register using a common access code if its velocity is above a threshold, such as 10 miles per hour. If the velocity is below the threshold, then mobile communication device 601 would only register with the base station having the stronger access code signal. In another example, mobile communication device 601 might dual register using a common access code if its movement is in a given directional range, such as a directional range that moves away from one base station and toward the other base station.

The use of velocity and/or directional range could be combined with a signal strength comparison. For example, if both access code signals are above a threshold, but device 601 is rapidly moving toward the base station having the weaker access code signal, then dual registration using a common access code is used. If both access code signals are above a threshold, but device 601 is rapidly moving toward the base station having the stronger access code signal, then device 601 registers with the stronger base station.

Figure 7:
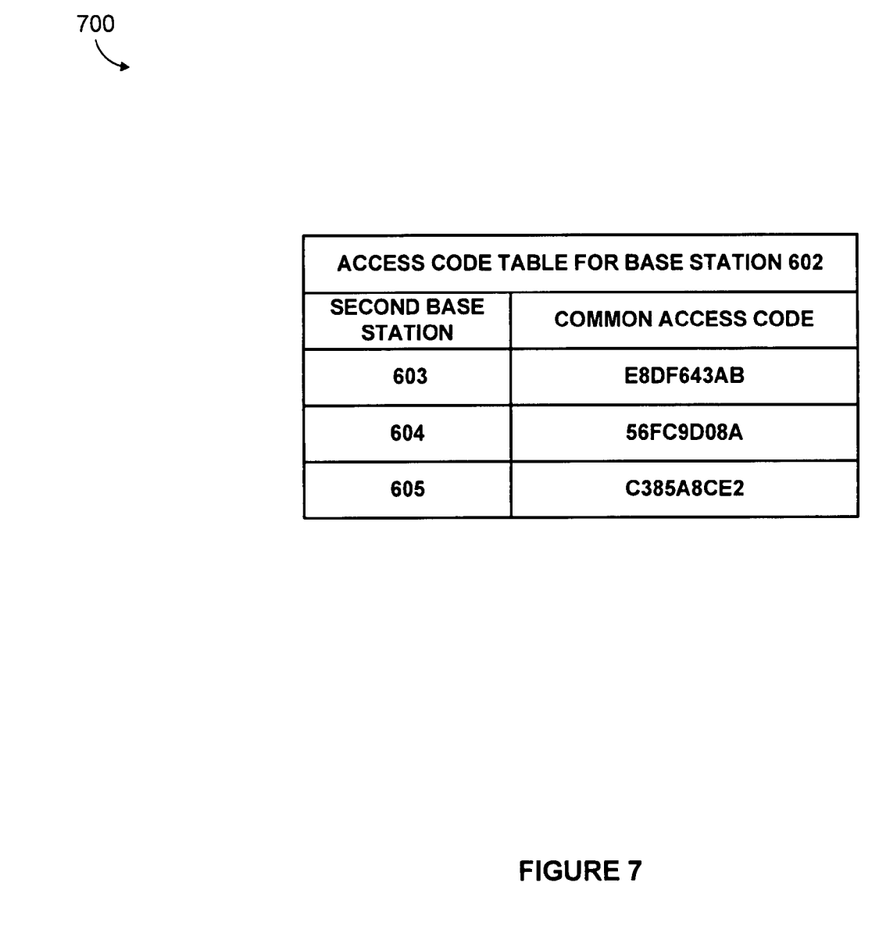
FIG. 7 illustrates a table for generating a common access code.

FIG. 7 illustrates table 700 that mobile communication device 601 may use to generate the common access code. Upon receiving the first base station access code from base station 602, mobile communication device 601 uses the first access code to retrieve table 700 for base station 602 to look up a common access code. The receipt of the second base station access code by mobile communication device 601 informs mobile communication device 601 that it is also capable of communicating with base station 603. Mobile communication device 601 enters table 700 with the access code for base station 603 to yield common the access code E8DF643AB for both base stations 602-603.

Table 600 also includes common access codes for base stations 604 and 605 (not pictured in FIG. 6), which are also within the vicinity of base station 602, but mobile communication device 601 is not within the coverage area of base stations 604 and 605. After generating the common access code from table 700, mobile communication device 601 wirelessly transmits the common access code to base station 602 and base station 603. For example, mobile communication device 601 might mask its electronic serial number with the common access code and transfer the masked electronic serial number.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
  wirelessly transmitting a first base station access code from a first base station, wherein the first base station access code allows wireless device registration with the first base station and not with a second base station;
  wirelessly transmitting a second base station access code from the second base station, wherein the second base station access code allows wireless device registration with the second base station and not with the first base station;
  in a wireless communication device, wirelessly receiving the first base station access code and the second base station access code and processing the first base station access code and the second base station access code to generate a common access code, wherein the common access code allows the wireless communication device to register with both the first base station and the second base station;
  wirelessly transmitting the common access code from the wireless communication device;
  in the first base station, wirelessly receiving the common access code and processing the common access code to initiate registration of the wireless communication device with the first base station; and
  in the second base station, wirelessly receiving the common access code and processing the common access code to initiate registration of the wireless communication device with the second base station.

2. The method of claim 1 further comprising, in the wireless communication device, selecting one of the first base station and the second base station for wireless communication service and de-registering with the other one of the first base station and the second base station.

3. The method of claim 1 wherein generating the common access code comprises, in the wireless communication device, accessing a data structure with the base station first access code and the second base station access code to obtain the common access code.

4. The method of claim 1 wherein generating the common access code comprises, in the wireless communication device, combining portions of the first base station access code and the second base station access code to obtain the common access code.

5. The method of claim 1 wherein generating the common access code comprises, in the wireless communication device, processing the first base station access code and the second base station access code with a mathematical function to obtain the common access code.

6. The method of claim 1 wherein generating and transmitting the common access code comprises, in the wireless communication device, generating and transmitting the common access code if a difference in received signal strength for the first base station access code and the second base station access code is below a threshold.

7. The method of claim 1 wherein generating and transmitting the common access code comprises, in the wireless communication device, generating and transmitting the common access code if received signal strengths for the first base station access code and the second base station access code are both above a threshold.

8. The method of claim 1 wherein generating and transmitting the common access code comprises, in the wireless communication device, generating and transmitting the common access code if a velocity of the wireless communication device is above a threshold.

9. The method of claim 1 wherein generating and transmitting the common access code comprises, in the wireless communication device, generating and transmitting the common access code if a movement of the wireless communication device is within a pre-determined directional range.

10. The method of claim 1 wherein the first base station access code, the second base station access code, and the common access code comprise code division multiple access codes.

11. A communication system comprising:
  a first base station configured to wirelessly transmit a first base station access code, wherein the first base station access code allows wireless device registration with the first base station and not with a second base station;
  the second base station configured to wirelessly transmit a second base station access code, wherein the second base station access code allows wireless device registration with the second base station and not with the first base station;
  a wireless communication device configured to wirelessly receive the first base station access code and the second base station access code, process the first base station access code and the second base station access code to generate a common access code, and wirelessly transmit the common access code, wherein the common access code allows the wireless communication device to register with both the first base station and the second base station;
  the first base station further configured to wirelessly receive the common access code and process the common access code to initiate registration of the wireless communication device with the first base station; and
  the second base station further configured to wirelessly receive the common access code and process the common access code to initiate registration of the wireless communication device with the second base station.

12. The communication system of claim 11 wherein the wireless communication device is further configured to select one of the first base station and the second base station for wireless communication service and de-register with the other one of the first base station and the second base station.

13. The communication system of claim 11 wherein the wireless communication device is further configured to generate the common access code by accessing a data structure with the base station first access code and the second base station access code to obtain the common access code.

14. The communication system of claim 11 wherein the wireless communication device is further configured to generate the common access code by combining portions of the first base station access code and the second base station access code to obtain the common access code.

15. The communication system of claim 11 wherein the wireless communication device is further configured to generate the common access code by processing the first base station access code and the second base station access code with a mathematical function to obtain the common access code.

16. The communication system of claim 11 wherein the wireless communication device is further configured to generate and transmit the common access code if a difference in received signal strength for the first base station access code and the second base station access code is below a threshold.

17. The communication system of claim 11 wherein the wireless communication device is further configured to generate and transmit the common access code if received signal strengths for the first base station access code and the second base station access code are both above a threshold.

18. The communication system of claim 11 wherein the wireless communication device is further configured to generate and transmit the common access code if a velocity of the wireless communication device is above a threshold.

19. The communication system of claim 11 wherein the wireless communication device is further configured to generate and transmit the common access code if a movement of the wireless communication device is within a pre-determined directional range.

20. The communication system of claim 11 wherein the first base station access code, the second base station access code, and the common access code comprise code division multiple access codes.

* * * * *